G. W. LALLY.
AUTOMOBILE COAL TRUCK.
APPLICATION FILED FEB. 28, 1911.

1,193,028.

Patented Aug. 1, 1916.
2 SHEETS—SHEET 1.

Witnesses:
C. L. Rogers
Anna Kelly

Inventor:
George W. Lally,
by Geo. N. Maxwell,
Attorney.

G. W. LALLY.
AUTOMOBILE COAL TRUCK.
APPLICATION FILED FEB. 28, 1911.

1,193,028.

Patented Aug. 1, 1916.
2 SHEETS—SHEET 2.

Witnesses:
C. L. Rogers
Anna Kelly

Inventor:
George W. Lally,
by Geo. J. P. Maxwell
Attorney.

UNITED STATES PATENT OFFICE.

GEORGE W. LALLY, OF BOSTON, MASSACHUSETTS, ASSIGNOR TO LALLY COMMERCIAL BODY COMPANY, A CORPORATION OF MASSACHUSETTS.

AUTOMOBILE COAL-TRUCK.

1,193,028.  Specification of Letters Patent.  Patented Aug. 1, 1916.

Application filed February 28, 1911. Serial No. 611,455.

*To all whom it may concern:*

Be it known that I, GEORGE W. LALLY, a citizen of the United States, and resident of Boston, in the county of Suffolk and State of Massachusetts, have invented an Improvement in Automobile Coal-Trucks, of which the following description, in connection with the accompanying drawings, is a specification, like characters on the drawings designating like parts.

The constantly extending use of self-driven vehicles for heavy hauling and freight service brings up certain problems involving the association of necessary features of automobile frame construction in connection with essential or desirable characteristics of the particular type of carrier body to be supported thereon. It is necessary that the automobile framework or chassis be of the usual fixed rigid construction with the driving and steering mechanism in proper relation thereto.

My invention has to do with the arrangement of a carrier body for coal or other commodities upon a standard or ordinary type of chassis, the body being so mounted as to be capable of ready elevation to a considerable height above the vehicle, and means being provided whereby the body can be turned and adjusted to a position most convenient for the discharge of the coal through a gravity chute or otherwise as conditions may require.

While my improved construction has been designed more especially for handling coal, it is obvious that it has other and more general fields of usefulness as for handling crushed stone, brick, etc.

The invention will be more fully understood by reference to the accompanying drawings, wherein—

Figure 1:
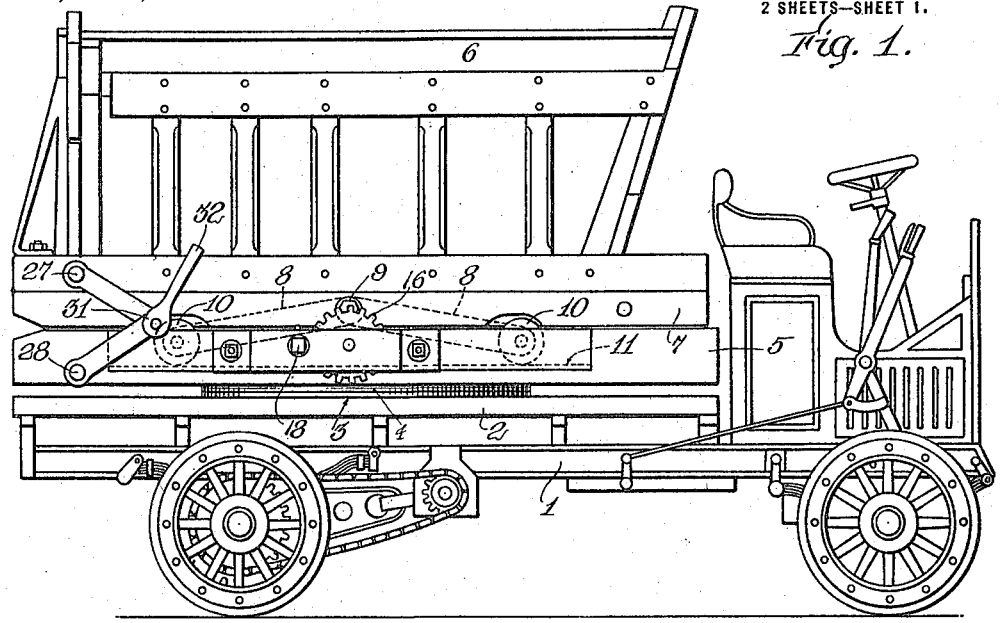
Figure 2:
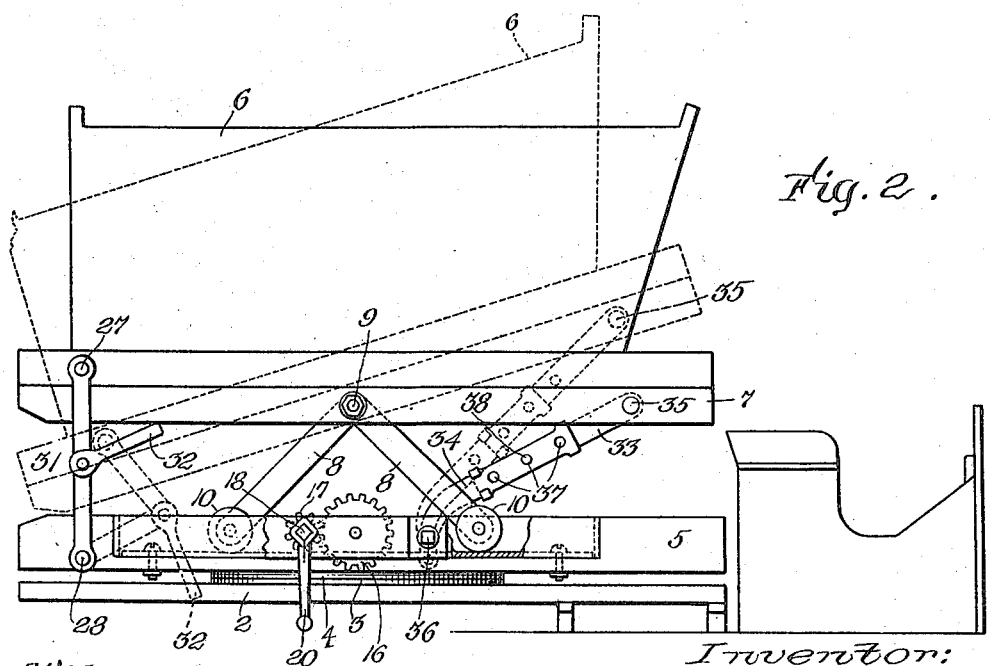
Figure 3:
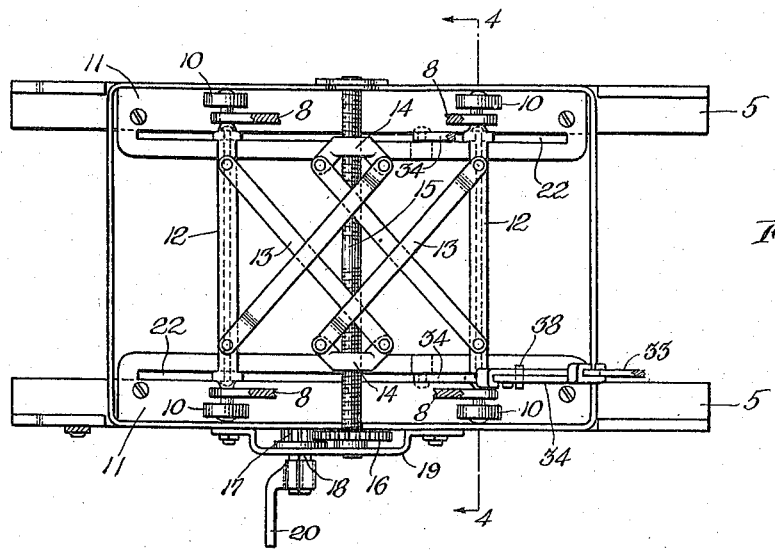
Figure 4:
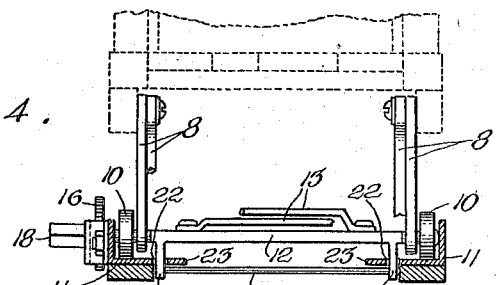
Figure 5:
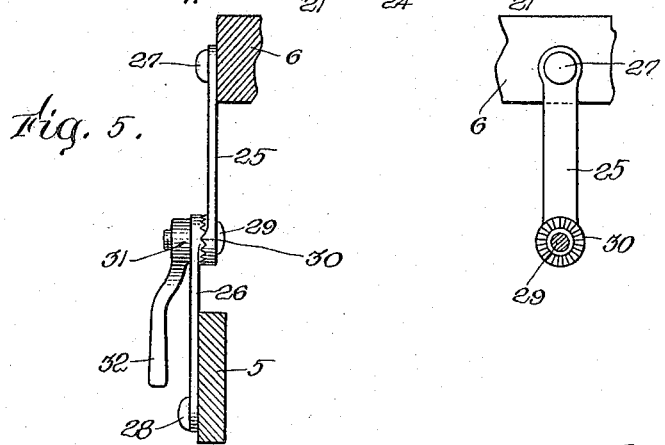
Figure 6:
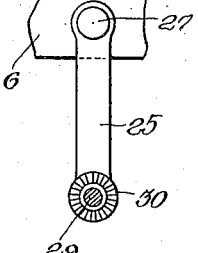

Figure 1 is a side elevation of an automobile having my improved mechanism fitted thereto; Fig. 2 is a similar partial side elevation showing the parts in a different adjusted position; Fig. 3 is a plan view of the operative mechanism for elevating the body, said body being omitted and the connections thereto being broken away; Fig. 4 is a transverse sectional view on line 4—4, Fig. 3; and Figs. 5 and 6 are detail views of a clamping adjustment.

The automobile framework or chassis 1 may be of any usual or desired rigid type, and has an elevated platform 2 at the rear portion thereof. The coal receptacle or body and its operating mechanism are mounted upon a turntable having its lower portion 3 fixed to the platform 2 and its upper coöperating portion 4 fixed to a framework 5 which carries the mechanism for elevating and controlling the coal receptacle or body 6. The body 6, when in lowered position, has lower rails 7 resting directly upon and supported by the framework 5. When in elevated position, the body is supported by pairs of links 8 pivoted to the sides of the body at 9, and having rollers 10 resting upon tracks 11 of the framework 5. The rollers 10 are carried by rods or bars 12 extending across the framework and these are adapted to be drawn toward each other or projected away from each other by a lazy-tongs mechanism 13 pivoted thereto and to nuts 14 engaged with oppositely threaded portions at the ends of a shaft 15. The shaft 15 is suitably journaled in the framework, and has fixed thereto at one end a gear wheel 16 engaged by a pinion 17 on a stub shaft 18, said gear wheel and pinion being suitably held in place as by a strap 19 fixed to the framework. The stub shaft 18 may have its projecting end square to receive a crank 20 for operating the same. It is apparent that as the shaft 18 is thus rotated and thereby the threaded shaft 15, the nuts 14 will be moved toward or away from each other, depending upon the direction of rotation and, through the lazy tongs 13, the bars 12 carrying the lower ends of elevating links 8 will be likewise moved toward or from each other, the rollers 10 meanwhile running freely along their trackways 11, thus minimizing frictional resistance. To prevent displacement of the parts, the bars 12 have ears 21 projected down through slotways 22 in inward extensions 23 of the trackways 11, and rods 24 may be engaged with such ears below the extensions 23, thus preventing upward displacement or removal of the bars 12 and parts controlled thereby, including the body 6.

It is necessary that provision be made for holding the body in different positions of tilted adjustment and, as a means to this end, I provide links 25 and 26 pivoted at 27 and 28 to the sides of the body base and to the supporting framework thereof respectively. The other ends of these links are pivoted on a pivot bolt 29, and their opposite faces are preferably serrated as shown at 30. A nut 31 having an operating arm 32 is threaded on the bolt 29, and thus adapted to force the serrated faces 30 of the links 25 and 26 into rigid engagement, thus locking the same and holding the body 6 in a position of tilted adjustment, determined by the extent that the arms 25 and 26 are flexed when clamped, and by the amount of elevation of the central fulcrum 9. To further assist in holding the body in adjusted positions, relatively slidable links 33 and 34 are pivoted to the base of the body at 35 and to the supporting framework at 36. These links have corresponding holes 37, and a locking pin 38 may pass through a selected pair of such holes to prevent relative movement of the link portions 33 and 34, and thus further lock the body in any one of a number of tilted positions. It is apparent that when the links 25 and 26 are relatively immovable either when fully straightened out as shown in Fig. 2, or when clamped in other positions, the pivot 27 may serve as a center about which the body may be swung by raising or lowering the links 8—8 by means of the mechanism described. The body 6 thus mounted can be readily swung around at right angles to the chassis for lateral discharge of the coal, even when in lowermost position the turn table 3 having the body supporting framework 5 carried thereby, being mounted on the elevated platform portion 2 above the running gear, and parts of the machine that would otherwise interfere with the angular adjustment of the body, thus enabling connection to be made to a chute or other discharge device most advantageously.

The link and lazy-tongs elevating mechanism as set forth enables the body to be elevated, lowered and tilted with a minimum of effort and very expeditiously.

It is to be observed that the relatively large turn table 3 furnishes a stable support for the parts carried thereby while the body base 7 normally resting on the framework 5 is likewise firmly supported thus making the whole structure rigid and secure against the shocks and jars of transit. By virtue of the turntable likewise, the body 6 can be easily turned to any angle relative to the chassis that may be most convenient for the coal discharge and the body 6 after being elevated to the desired height by manipulation of the crank 20, may then be securely locked in the proper elevated and tilted position by clamping up the nut 31 against the end of the link 25 to cause engagement of the serrated faces of links 25, 26, and introducing the pin 38 through the appropriate holes 37.

Having described my invention, what I claim as new and desire to secure by Letters Patent is as follows:

1. An apparatus of the kind described, comprising a body having a framework on a vehicle platform and normally arranged to rest over said framework for a substantial portion of its length, and means for lifting the body vertically free from said framework, consisting of a double lazy-tongs device flatwise and horizontally disposed and housed in said framework, and links connected to said lazy-tongs and extending up to a common pivotal connection with the body at an approximately central point thereof, said lazytongs being each operated by a rotatable horizontally arranged shaft positioned transversely of the vehicle.

2. An apparatus of the kind described, comprising a body having a framework mounted to turn on a vehicle platform, said body being normally arranged to have a bearing rest for substantially its entire length on said framework, and means for lifting the body vertically from said framework, said means consisting of a double lazy tongs device flatwise and horizontally disposed and housed in said framework and links connected to each of said lazy tongs and extending up to a common engagement with the body at an approximately central point thereof, said lazy tongs being operable by a transversely rotatable shaft.

3. An apparatus of the kind described, comprising a body having a framework on a vehicle platform and arranged to normally have a bearing rest over a substantial portion of its length on said framework, and means for lifting the body vertically from said framework consisting in a flatwise horizontally disposed double lazy tongs device housed in said framework, each lazy tongs being connected to parallel bars movable from and toward each other guided on said framework and links pivoted to said bars and extending up to a common pivotal engagement with the body at an approximately central portion thereof, both said lazy-tongs being operable by the rotation of the same shaft.

In testimony whereof, I have signed my name to this specification, in the presence of two subscribing witnesses.

GEORGE W. LALLY.

Witnesses:
C. L. ROGERS,
ANNA KELLY.

Copies of this patent may be obtained for five cents each, by addressing the "Commissioner of Patents, Washington, D. C."